United States Patent [19]

Grant et al.

[11] Patent Number: 5,341,204
[45] Date of Patent: Aug. 23, 1994

[54] SHEARING OPTICAL ELEMENT FOR INTERFEROMETRIC ANALYSIS SYSTEM

[75] Inventors: Ralph M. Grant; Forrest Wright, both of Rochester, Mich.

[73] Assignee: Grant Engineering, Inc., Rochester, Mich.

[21] Appl. No.: 84,570

[22] Filed: Jun. 29, 1993

[51] Int. Cl.[5] .............................................. G01B 9/02
[52] U.S. Cl. .................................. 356/35.5; 356/353
[58] Field of Search ................... 356/353, 354, 35.5, 356/345; 73/800

[56] References Cited

U.S. PATENT DOCUMENTS 4,690,552  9/1987  Grant et al. ........................ 356/354
4,887,899  12/1989  Hung .................................. 356/35.5

*Primary Examiner*—Samuel A. Turner
*Assistant Examiner*—Robert Kim
*Attorney, Agent, or Firm*—Krass & Young

[57] ABSTRACT

Method and apparatus for analyzing the deformation of an object resulting from the application of stress. A novel optical element is used to perform shearometric analysis upon a test object. The novel optical element has an overall pattern of first and second pluralities of regions having significantly different indices of transmissivity. The pattern of variations causes pairs of light rays which are reflected from two distinct points on the test object at a divergent angle to emerge from the optical element so that they are nearly parallel. The nearly parallel rays are then received upon a photoelectrical sensing means such as a video camera or photoelectric array. Because the rays impinging thereon are nearly parallel, they may be adequately resolved by the photoelectric sensing means, thus enabling shearometric analysis to be performed electronically in a rapid and cost-effective manner.

14 Claims, 2 Drawing Sheets

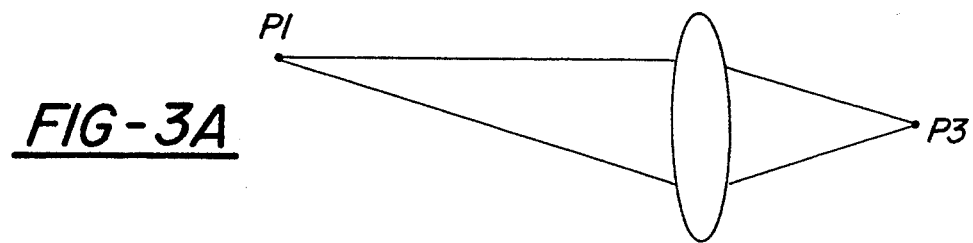
FIG-3A
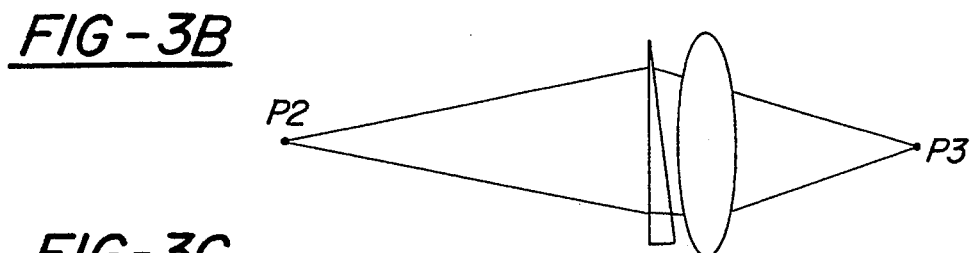
FIG-3B
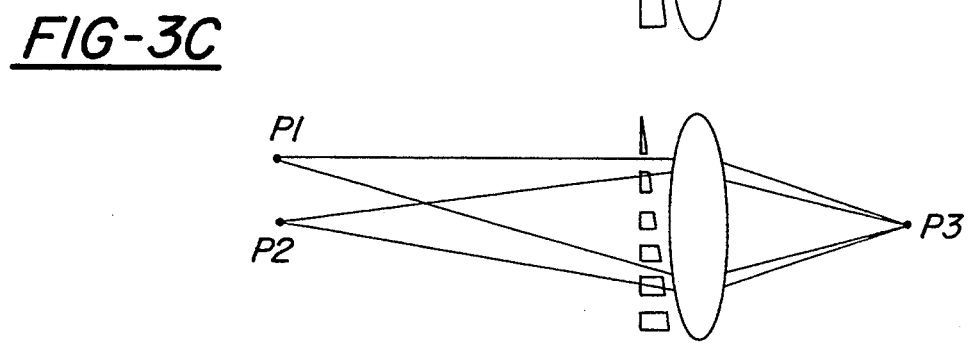
FIG-3C
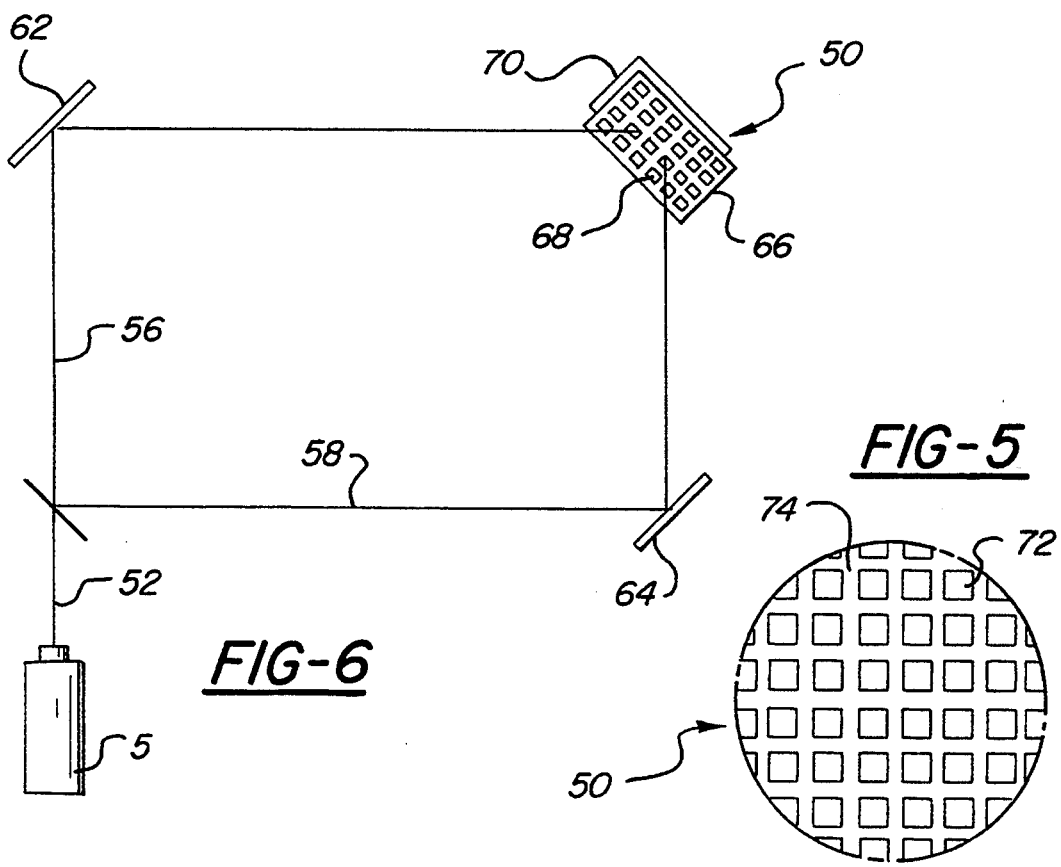
FIG-5
FIG-6

SHEARING OPTICAL ELEMENT FOR INTERFEROMETRIC ANALYSIS SYSTEM

FIELD OF THE INVENTION

The present invention relates to interferometric analysis of the deformation of an object's surface in response to an applied stress and more particularly to a novel optical element for producing an interferogram using coherent light reflected from the object's surface.

DESCRIPTION OF THE RELEVANT PRIOR ART

Double exposure interferometry is a method for analyzing the deformations in an object's surface which result from the application of applied stress. The surface is illuminated with coherent light and the light reflected from the surface is interfered with a reference beam of light and a recording is made of the resulting interferogram. The object is then stressed, as by changing the pressure on the object or heating it, and a second interferogram is recorded on the same media, photographic or electronic, in which the first interferogram was recorded. The deformation of the object's surface between the two exposures creates an interference or moire' pattern between the two interferograms containing fringe families which map the deformation.

In holographic interferometry the interference patterns are created between coherent light reflected from the object's surface and a reference beam derived from the same coherent source, usually a laser. U.S. Pat. No. 4,139,302 discloses such a system. In a species of double exposure interferometric analysis known as shearography, the interferograms are created by passing light reflected from the coherently illuminated object's surface through an optical element or system, which produces two focussed images of the surface, slightly laterally displaced from one another or "sheared." This "shearography" technique is advantageous compared to holographic double exposure interferometric analysis in that the resulting fringe lines map the strain of the object's surface, that is, the displacement points on the object surface relative to one another; overall deformation as a result of the applied stress does not produce fringe patterns. As a result, the shearographic technique is much less dependent upon the stability of the object and apparatus during the analysis then is holographic interferometry.

U.S. Pat. Nos. 4,887,899 and 5,011,280 disclose apparatus for performing shearography wherein the individual interferograms are recorded electronically on a photosensitive surface rather than using photographic film as a recording media. This is advantageous in terms of the speed and economy of the process but the fact that electronic recording has a much lower resolution ability than photographic film requires the use of a shearing optical element which produces a very small angle between two interfering beams. The frequency of the fringes in the interferogram is a direct function of this angle and an electronic recording medium is incapable of recording the fringe frequencies which would result from a relatively large angle. The shearing system used with U.S. Pat. Nos. 4,887,899 and 5,011,280 constitutes a prism of birefringerant material coupled with a polarizer. The polarizer substantially reduces the amount of illumination available for imaging and hence a higher powered laser must be used in the process. Furthermore, the polarizer increases scatter resulting in a lower signal to noise ratio making the interferogram less sensitive.

U.S. Pat. No. 4,690,552 discloses a shearographic system for measuring strain in any of a plurality of directions. A shearing diffraction grating is used as the optical element. The shearing diffracting grating has lines extending in a plurality of directions, i.e., straight lines running in two orthogonal directions, radial lines emanating from a common center, etc. However, such diffraction gratings are not designed to minimize the angle between two interfering beams.

SUMMARY OF THE INVENTION

Accordingly, the present invention is directed toward a novel optical element for use in shearography, which is much simpler and much more conservative of light than the previous elements. The shearing element of the present invention is formed with an overall pattern of transmission variations over a surface that receives coherent light reflected from the object. In a preferred embodiment of the optical element, a first plurality of transmission regions directly transmit light beams from the object's surface to a focussing lens without bending the beams by diffraction or refraction. A second group of transmission regions either diffract or refract rays from the object's surface so as to bend them through a small angle in their path to the focussing lens. As a result, the light beams which have passed through the first plurality of transmission regions produce a focussed image of the object's surface which is very slightly displaced relative to a second focussed image of the object's surface produced by the light beams passing through the second plurality of regions.

In one embodiment of the present invention, which will subsequently be described in detail, the shearing optical element comprises a prism having a uniform pattern of perforations formed therethrough. The perforations are preferably aligned with respect to the optical axis formed between the object and a photoelectric recording media. Because the prism is perforated, it will act, in effect, as a plurality of small prisms; some of the reflected light beams from the object will pass through the holes of the prism and pass unaffected to a focussing lens, and other beams will pass through the neighboring, intact regions of the prism, and will be refracted at a small angle.

In an alternative embodiment of the invention, an overall pattern of small, wedge-like protrusions is formed over the surface of the optical element. These wedge-like protrusions will then diffract light at a greater angle than the remaining portions of the element. The protrusions themselves may be of different configurations, and like the perforations in the embodiment described in the preceding paragraph, may be variously spaced to give different optical characteristics to the optical element.

In another embodiment, the optical element is a hologram created by masking portions of a photographic medium prior to exposing it to coherent light. The mask has an overall pattern of openings (round, square, etc. in configuration) which allow the beam of the laser light source to pass through, thus creating the first plurality of regions of first transmissivity. The masked regions block the coherent light beam, thus forming the second plurality of regions of second transmissivity on the photographic emulsion. In a further embodiment a phase hologram can be made without the mask where the amplitude of the phase variation is adjusted to produce most of the diffracted light in two beams of nearly equal amplitude but diffracted at a small angle to one another.

In performing the method of the present invention, the object to be analyzed (such as a tire) is illuminated with a source of coherent light, i.e., a laser, and then, while the object is in a first state or condition of stress, the light reflected from the stressed object is passed through the optical element. First and second light beams reflected from two distinct points on the surface of the object interfere with each other at a small angle to produce a first interferogram. The first interferogram is recorded on a photoelectric sensing means such as a photoelectric array or the image plate of a video camera, thereby producing first electric signals indicative of the first interferogram. These first electronic signals may be stored in the memory of a digital computer for later digital processing.

Then, and in accordance with standard shearographic methods, the object is put in a second condition or state of stress, such as by subjecting it to a sudden change in pressure or temperature. Various means for creating a second condition of stress are disclosed in the prior art; see, for example, U.S. Pat. No. 4,702,594. After the object has been placed in the second condition of stress, light reflected from the object is passed through the optical element to cause third and fourth light beams reflected from the two distinct points on the surface of the object to interfere with each other at a small angle to produce a second interferogram. The second interferogram is also recorded on the photoelectric sensing means to produce second electronic signals indicative thereof.

The second electronic signals may then be digitally processed in various ways with the first electronic signals, previously stored in the computer memory, to produce a superimposed, composite image of the object which has fringe families arrayed as a function of the relative deformation of the object produced by the second condition of stress with respect to the first condition of stress. For example, the set of second electronic signals can be subtracted from the set of first electronic signals. Of course, a sudden change in pressure may cause the object to deform in a uniform manner and, on the superimposed, composite image, the uniform deformation will appear as an all-over interference pattern of relatively high frequency. However, areas which have not deformed uniformly due to the existence of an otherwise undetectable weakness or defect will appear as relatively low frequency fringes.

The areas of high and low frequency may be electronically processed to produce an easily readable image on, for example, a CRT. For example, the low frequency fringes may be filtered out to be read on the CRT screen as dark areas which contrast with the light areas of high frequency. Alternatively, the areas of high frequency may be filtered out in a similar manner. Furthermore, other digital processing techniques, such as false color imaging may be used so that the fringes caused by non-uniform deformation will display on the CRT as one distinct color, with the background area of no fringe, uniform deformation, showing as a second, distinct color.

BRIEF DESCRIPTION OF THE DRAWINGS

The following detailed description may best be understood by reference to the drawings, in which:

FIGS. 3a–c are schematic diagrams which illustrate the optical principles of the present invention;

FIG. 5 is a perspective view of a holographic optical element useful in practicing the present invention, and FIG. 6 is a schematic diagram of how the element of FIG. 5 is made.

DETAILED DESCRIPTION OF THE PREFERRED EMBODIMENTS

Figure 1:
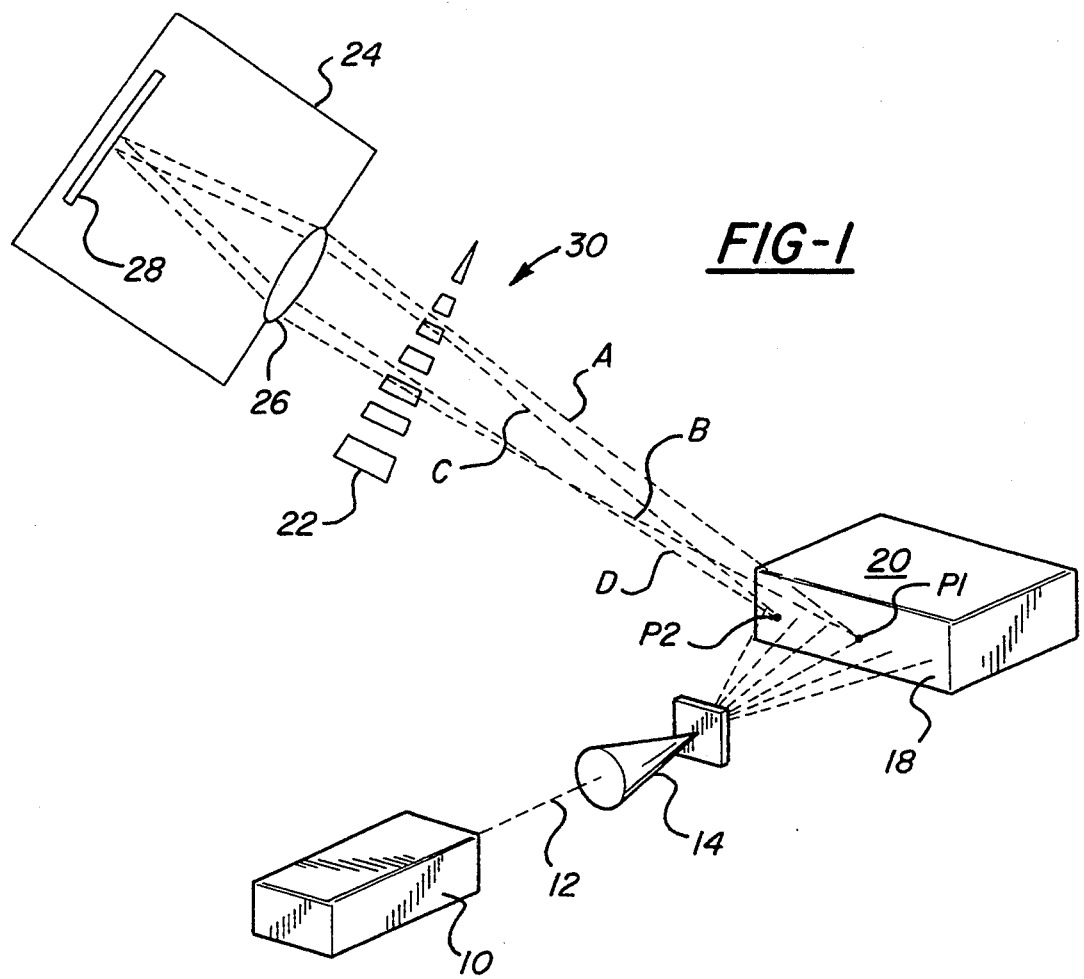
FIG. 1 is a combined diagrammatic and perspective view of an optical inspection system in accordance with the present invention.
Figure 2:
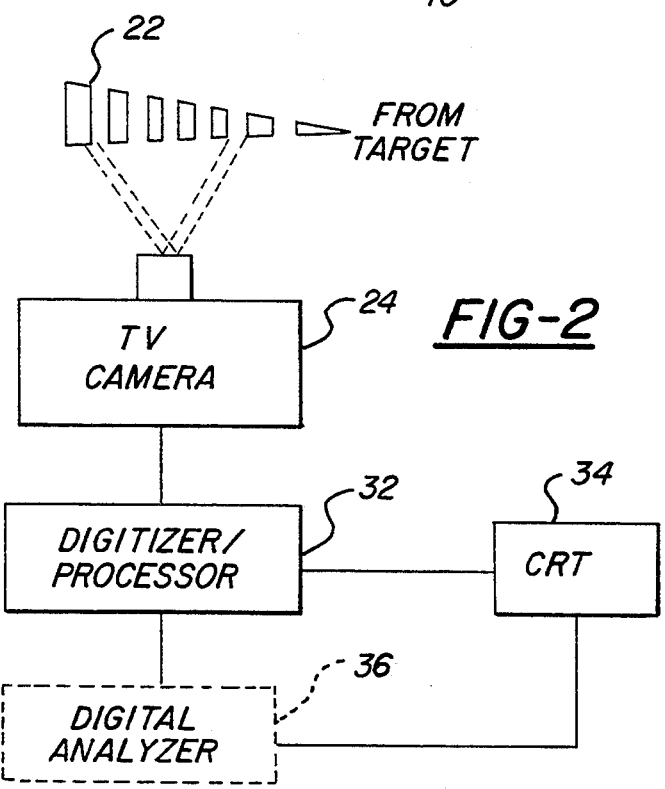
FIG. 2 is a combined diagrammatic and block diagram of a display and processing apparatus for use in connection with the system shown in FIG. 1.

Throughout the following detailed description, like numerals are used to reference the same element of the claimed invention shown in multiple figures thereof. Referring first to FIGS. 1 and 2, the method and apparatus of the present invention are adapted to analyze the strain pattern occurring on the surface 18 of an object 20 under study as a result of a second condition of stress imposed on the object by any of several techniques such as altering the ambient pressure on the object, changing the object's temperature, or changing mechanical loading on the object. As particularly shown herein, the object 20 is block shaped for illustrative purposes, but may, by way of example, consist of a rubber molding that is to be tested for inclusion adjacent to the surface 18. Surface 18 is illuminated with a coherent light derived from a laser 10. Laser 10 outputs a laser beam 12 which passes through a diverging lens 14 and pinhole filter 16 so as to expand the beam. Alternatively, the beam 12 could be expanded with a ground glass diffuser or the like.

Coherent light reflected from the surface 18 such as rays A, B, C, D is reflected through the lens 26 of a television camera 24 by way of an optical element 22. Optical element 22 may be wedge-shaped in cross section and has a plurality of perforations 30 (not shown to scale) formed therethrough. Preferably, the pattern of perforations 30 is uniform throughout the optical element 22. Reflected rays A and D, which are reflected from two distinct points P1 and P2 on surface 18, pass through a perforation 30 and remain unrefracted. In contrast, reflected rays B and C, which are also reflected, respectively, from points P1 and P2, pass through the intact portions of optical element 22 and are refracted. As will be explained in more detail further on, this arrangement causes the pairs of reflected rays A–C (reflected from P1 and P2) and B–D (also reflected from both points P1 and P2) to emerge from optical element 22 nearly parallel. The nearly parallel ray pairs then pass through lens 26 and converge to interfere with each other on the surface of the signal plate 28 of the camera 24. Ray pairs A–C and B–D thus form an interfering image corresponding to points P1 and P2 on the surface 18 of target 20.

In accordance with the method of the present invention, the signal plate 28 is exposed to a first image of the surface 18 while the object 20 is in a first condition of stress, thereby producing a first interferogram on signal plate 28. The interferogram on signal plate 28 is scanned, thereby producing video signals corresponding to one frame of the television image; these video signals are then digitized and stored in a conventional digitizer/processor 32.

A stress is then applied to the object 20 to put it in a second condition of stress, and the signal plate 28 is exposed a second time to an image of the surface 18, thereby creating a second interferogram which is also scanned to produce second video signals corresponding to another frame of the television image. The second video signals are then digitized and stored in digitizer/processor 32. The first and second video signals derived from the first and second interferograms are then processed by one of several techniques which can include adding, subtracting, multiplying, or dividing the first and second video signals. The resulting processed image can be enhanced using conventional image processing techniques by digitizer/processor 32, and the resultant signals are displayed as a final composite, superimposed image on a CRT 34. If desired, the digitized images may be analyzed by a digital analyzer 36 prior to display on CRT 34. Digital analyzer 36 may comprise any of various apparatus for analyzing and operating on digitized image data such as the apparatus disclosed in U.S. Pat. No. 4,167,728, which apparatus consists of a chain of substantially identical serial neighborhood transformation modules which are utilized to analyze patterns represented by a serial stream of digitized electrical signals representing a matrix of points corresponding to the image. Of course, other processing techniques, such as thresholding, filtering, and false color imaging may alternatively or additionally be used.

The operation of optical element 22 may best be understood by reference to FIGS. 3a–c. First consider standard, prior art shearography. The basic idea is to have light from one point on the object, such as P1 in FIG. 3a, interfere at point P3 with light from a neighboring point such as P2 in FIG. 1b. This can be accomplished by having the light from P2 be deflected to P3 by a wedge. In standard film shearography, the wedge covers only half the lens so that the light from P1 passes through the uncovered half in the manner depicted in FIG. 3a, and the light from P2 goes through the wedge half to be diffracted in the manner depicted in FIG. 3b. (Of course, light from both points goes through both halves, leading to the double image on the film.) The interference at P3 results from light coming from the two halves of the lens and produces a relatively high-frequency carrier fringe pattern on the film which is recorded by the film on the first exposure when the object is in a first condition of stress. The second exposure of the deformed object produces a similar high frequency fringe pattern, shifted in phase at points so as to produce low frequency "beat" fringes which are visible when using spatial filtering in the viewer. The high frequency carrier recorded on the film as a result of the prior art half lens wedge is an advantage when using film because the viewer can filter out the ambient light and use the diffraction of light by this high frequency carrier to produce the light in the output image plane of the viewer. Points where this high frequency carrier has been "washed out" by the shifting of the fringes between exposures will show up as dark bands in the final image.

When using video shearography, the advantage of the high frequency carrier discussed above becomes a disadvantage because the ridicon cannot resolve this high a frequency. Of course, it is possible to stop down the lens of the video camera and limit the light rays to those coming from near the edge of the wedge. This will lead to a small angle between rays originating at P1 and rays originating at P2 as they arrive at P3. The vidicon can then have some chance of recording these fringes. However, this scheme will only work to the extent that the vidicon has been able to resolve the carrier fringes resulting from the light rays from P1 and P2 interfering at P3. This means that, in order for a video system to resolve the carrier fringes successfully, the rays from P1 and P2 should arrive at P3 at nearly the same angle.

The multi-hole optical element 22 shown in FIG. 3c represents a combination of FIGS. 3a and 3b. Light rays from P2 going through a wedge section and light rays from P1 going through the adjacent hole will arrive at P3 at a small angle, and therefore produce a carrier fringe pattern of sufficiently low frequency to be resolved by the vidicon. By providing a uniform pattern of perforations through optical element 22, nearly all the ray pairs reflected from any distinct pairs of points on the surface of the test object will arrive at the imaging device from very nearly the same direction.

It has been found by experimentation that the best resolution is achieved when optical element 22 is provided with perforations 30 which each have a diameter in a range of between 0.1 and 0.5 mm. Preferably, the density of the uniform pattern of perforations 30 is approximately 50 and 100 per square centimeter of prism surface. In the embodiment depicted, the perforations 30 are approximately aligned with an optical axis formed by the surface 20 of the object 18 and the signal plate 28. However, in some applications, it may be desirable to have perforations which are angled with respect to the main optical axis of the system.

Of course, while the embodiment shown depicts a photoelectric receiver in the form of a video camera 24, the present invention may also be advantageously employed with other types of photoelectric sensing means. For example, an array of photoelectric sensors may be provided, either as a linear array, or as a two-dimensional array. If a linear array is used, then it will be necessary for the linear array to scan the optical image coming from the test surface, preferably by moving the array itself. If a two-dimensional array is used, then scanning may not be necessary. Preferably, the light sensing elements comprising the array may be such known prior art devices as charge coupled devices, photo diodes, etc.

Figure 4:
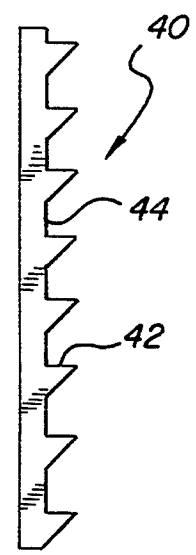
FIG. 4 is a side view of an alternative embodiment of an optical wedge suitable for use in practicing the present invention.

Another embodiment of an optical element suitable in practicing the present invention is illustrated in FIG. 4. In this embodiment, optical element 40 has a plurality of small, wedge-like projections 42 formed thereon. The projections 42 diffract light which strikes them. Element 40 also includes a plurality of lands 44 interposed between the projections 42. A light beam which passes through a land 44 will not be diffracted. Because of the overall pattern of projections and lands, the angle between any pair of interfering light beams which pass through a projection 42 and a neighboring land 44 will necessarily be quite small. Preferably, the projections are spaced very close together at a distance of approximately 0.1 mm apart.

FIGS. 5 and 6 depict, respectively, yet another embodiment of an optical element 50 useful in the present invention and how it is made. In this case, element 50 is a transmissive holographic element which has an overall pattern of transmission variations formed over its surface. As can be seen in FIG. 6, the patterned HOE is made by splitting a beam 52 from a laser source 54 into two divergent beams 56,58 by means of beam splitter 60. Both beams 56,58 are then directed by mirrors 62 and 64 through a mask 66 having a pattern of openings 68 formed therein. Beams 56 and 58 pass through the openings 68 of mask 64 onto the surface of a photographic emulsion 70. The two beams 56,58 create an interference pattern on the emulsion 70 only in discrete areas 72 (shown in FIG. 5) thereon corresponding to the openings 68 of mask 66. However, the mask 66 will block the coherent light to the remainder of the emulsion 70. When emulsion 70 is developed, these masked areas 74 will be transmissive to light, whereas the areas 72 will include interference fringes which diffract light. These areas 72 may further be bleached to produce a phase grating which will diffract light. In this case the mask may be unnecessary if the amplitude of the phase grating is adjusted so that most of the diffracted light is split between two beams of nearly equal amplitude but diffracted at a small angle between these two beams.

Of course, other ways of varying the transmissivity of the optical wedge of the present invention may occur to one skilled in the art without departing from the principles of the present invention. For example, the shape and spacing of the wedge-like protuberances as illustrated could be varied. Such design variations are considered to be within the scope of one skilled in the art in accordance with the teachings of the present invention. Therefore, although the present invention is described with reference to certain exemplifications and embodiments thereof, the scope of the present invention is not restricted to the depicted and described designs but, rather, solely by the claims appended hereto and all reasonable equivalents thereof.

What is claimed is:

1. A method of analyzing the strain of an object resulting from the application of stress thereon comprising the steps of:
    a) illuminating the object with a source of coherent light;
    b) passing light reflected from said object while in a first condition of stress, through an optical element having a plurality of regions characterized by a first index of transmissivity and a second plurality of regions characterized by a second index of transmissivity significantly different from said first index, said first and second regions being arrayed in an overall pattern such that a first set of light beams reflected from a first set of distinct points on a surface of the object to pass through said first plurality of regions and interfere at a small angle with a second set of light beams reflected from a second set of distinct sets on said surface and passed through said second plurality of regions to produce a first interferogram;
    c) recording said first interferogram on a photoelectric sensing means to produce first electronic signals indicative of first interferogram;
    d) passing light reflected from said object while in a second condition of stress through said optical element to cause third and fourth sets of light beams reflected from said first and second sets of distinct points on the surface of the object to interfere with each other at a small angle to produce a second interferogram;
    e) recording said second interferogram on said photoelectric sensing means to produce second electronic signals indicative of said second interferogram; and
    f) digitally processing said first and second electronic signals to produce a superimposed, composite image of the object having fringe families arrayed as a function of the relative strain of the object produced by the second condition of stress with respect to the first condition of stress.

2. A method of analyzing the strain of an object resulting from the application of stress thereon comprising the steps of:
    a) illuminating the object with a source of coherent light;
    b) passing light reflected from said object while in a first condition of stress, through an optical prism having a uniform pattern including a first plurality of wedge-like protuberances characterized by a first index of transmissivity and a second plurality of intervening lands characterized by a second index of transmissivity significantly different from said first region such that first and second light beams reflected from two distinct points on a surface of the object interfere with each other at a small angle and produce a first interferogram;
    c) recording said first interferogram on a photoelectric sensing means to produce first electronic signals indicative of first interferogram;
    d) passing light reflected from said object while in a second condition of stress through said optical prism to cause third and fourth light beams reflected from said two distinct points on the surface of the object to interfere with each other at a small angle to produce a second interferogram;
    e) recording said second interferogram on said photoelectric sensing means to produce second electronic signals indicative of said second interferogram; and
    f) digitally processing said first and second electronic signals to produce a superimposed, composite image of the object having fringe families arrayed as a function of the relative strain of the object produced by the second condition of stress with respect to the first condition of stress.

3. A method of analyzing the strain of an object resulting from the application of stress thereon comprising the steps of:
    a) illuminating the object with a source of coherent light;
    b) passing light reflected from said object while in a first condition of stress through an optical element having a uniform pattern of perforations formed therethrough and including a first plurality of regions characterized by a first index of transmissivity and coinciding with intact areas of said optical element and a second plurality of regions coinciding with said plurality of perforations characterized by a second index of transmissivity significantly different from said first index such that first and second light beams reflected from two distinct points on a surface of the object interfere with each other at a small angle and produce a first interferogram;
    c) recording said first interferogram on a photoelectric sensing means to produce first electronic signals indicative of first interferogram;
    d) passing light reflected from said object while in a second condition of stress through said optical element to cause third and fourth light beams reflected from said two distinct points on the surface of the object to interfere with each other at a small angle to produce a second interferogram;

e) recording said second interferogram on said photoelectric sensing means to produce second electronic signals indicative of said second interferogram; and f) digitally processing said first and second electronic signals to produce a superimposed, composite image of the object having fringe families arrayed as a function of the relative strain of the object produced by the second condition of stress with respect to the first condition of stress.

4. The method of claim 1 wherein the steps of passing light reflected from the object in said first and said second conditions of stress through an optical element having a uniform pattern of transmission variations formed therein includes the further step of passing said reflected light through a holographic grating having an overall pattern of first and second regions formed by selectively masking portions of a photographic medium before exposing said medium to coherent light.

5. The method of claim 1 including the further steps of:
digitizing said composite image;
storing the digitized composite image; and
displaying the digitized composite image.

6. The method of claim 1 wherein the steps of recording said first, second, third and fourth sets of light beams on a photoelectric sensing means includes the further step of passing said sets of light beams onto an array of light detecting elements.

7. An apparatus for use in generating an image of an object containing interference fringes comprising:
means for producing a beam of coherent light;
a lens for directing said coherent beam onto said object, said lens having a substantial portion of its surface covered by an optical element having a first plurality of regions characterized by a first index of transmissivity and a second plurality of regions characterized by a second index of transmissivity significantly different from said first index, said first and second plurality of regions of being arrayed in an overall pattern such that first and second sets of rays reflected from first and second sets of distinct points on the surface of the object are passed by said element so that the first and second sets of rays are nearly parallel to each other;
photoelectric sensing means for receiving said nearly parallel sets of rays and operative to produce an image of said object from said passed sets of rays;
means for digitizing said images; and
means for storing the digitized image.

8. The apparatus of claim 7 wherein said photoelectric sensing means is an array including a plurality of photoelectric detectors.

9. The apparatus of claim 8 wherein each of said plurality of photoelectric detectors is a charge coupled device.

10. The apparatus of claim 8 wherein each of the plurality of photoelectric detectors is a photo diode.

11. The apparatus of claim 7 wherein said photoelectric sensing means is a signal plate of a television camera.

12. An apparatus for use in generating an image of an object containing interference fringes comprising:
means for producing a beam of coherent light;
a lens for directing said coherent beam onto said object, said lens having a substantial portion of its surface covered by a prism having a plurality of perforations formed therethrough and including a first plurality of regions characterized by a first index of transmissivity and coinciding with intact areas of said prism and a second plurality of regions coinciding with said plurality of perforations and characterized by a second index of transmissivity significantly different from said first index such that first and second rays reflected from distant points on the surface of the object are passed by said prism so that they are nearly parallel to each other;
photoelectric sensing means for receiving said nearly parallel rays and operative to produce an image of said object from said passed rays;
means for digitizing said images; and
means for storing the digitized image.

13. An apparatus for use in generating an image of an object containing interference fringes comprising:
means for producing a beam of coherent light;
a lens for directing said coherent beam onto said object, said lens having a substantial portion of its surface covered by a prism having a first plurality of wedge-like protuberances characterized by a first index of transmissivity and a second plurality of intervening lands characterized by a second index of transmissivity significantly different from said first index, said first and second plurality being arrayed in an overall pattern such that first and second rays reflected from distant points on the surface of the object are passed by said prism so that they are nearly parallel to each other;
photoelectric sensing means for receiving said nearly parallel rays and operative to produce an image of said object form said passed rays;
means for digitizing said images; and
means for storing the digitized image.

14. The apparatus of claim 7 wherein said optical element comprises a holographic element including first and second regions formed by selectively masking portions of a photographic medium and subsequently exposed said medium to coherent light.

* * * * *